Aug. 10, 1937. A. R. MORRILL 2,089,852
MACHINE FOR OPERATING UPON SHOES
Filed Feb. 24, 1936 10 Sheets-Sheet 5

Fig. 5.

Witness
F.Q. Wright

Inventor
Alfred R. Morrill
by Fish Hildreth
Cary & Jenney
attys

Aug. 10, 1937.      A. R. MORRILL      2,089,852
MACHINE FOR OPERATING UPON SHOES
Filed Feb. 24, 1936      10 Sheets-Sheet 8

Aug. 10, 1937. A. R. MORRILL 2,089,852
MACHINE FOR OPERATING UPON SHOES
Filed Feb. 24, 1936 10 Sheets-Sheet 9

Patented Aug. 10, 1937

2,089,852

UNITED STATES PATENT OFFICE 2,089,852

MACHINE FOR OPERATING UPON SHOES

Alfred R. Morrill, Beverly, Mass., assignor to United Shoe Machinery Corporation, Paterson, N. J., a corporation of New Jersey Application February 24, 1936, Serial No. 65,266

15 Claims. (Cl. 12—17)

The present invention relates to automatic shoe machines, and is herein disclosed as embodied in an automatic edge setting machine of the type in which the shoe and the edge setting devices are moved relatively to transfer the point of operation about the shoe, and in which mechanism is provided for relatively moving the edge setting devices and the shoe to maintain the edge setting devices and the shoe in the proper relative positions at the point of operation as such point is transferred about the shoe.

While the several features of the invention are particularly adapted for use in an automatic edge setting machine, it will be understood that certain features are not so limited, but are applicable to automatic machines for performing trimming or other operations about the sole margin of a shoe.

It is a principal object of the invention to provide in an automatic machine of this general description having supporting and positioning devices for moving the jack to transfer the point of operation about the shoe, a novel and improved means for controlling the operation of the supporting and positioning devices to transfer the point of operation again about the shoe in a reverse direction.

It is a further object of the invention to provide a machine of this general description which is particularly adapted for the performance of an edge setting operation to form a smooth, highly polished edge and to eliminate characteristic traces or marks which might be left by an edge setting tool or tools during the automatic transfer of the point of operation about the shoe sole in one direction.

It is a further object of the present invention to provide an automatic edge setting machine of this general description which is particularly well adapted for operation upon shoes having sharply angled sole edge contours, as for instance, spade shank shoe soles to permit the proper setting of the edge on each side of the corner without rounding off or otherwise marring the same.

With these and other objects in view as may hereinafter appear, one feature of the invention consists in the provision of means operative after the point of operation has been transferred once around the shoe to reverse the pattern cam shaft so that the point of operation may be transferred about the shoe in a reverse direction and following substantially an identical path by means of the same cams and operating connections. In connection with the edge setting machine herein disclosed, this mode of operation of the jack supporting and positioning devices is of advantage specifically to offset and neutralize any characteristic marks or traces upon the work which may have been produced by the set of the tools or positioning devices during the feed in one direction.

Another feature of the invention consists in the provision of automatically acting means rendered operative at the completion of the operation upon one side of a sharply angled contour of the sole edge, such as that provided between the shank and ball portion of a spade shank shoe sole, to relatively disengage the operating tools from the shoe, and thereafter to position the tools against the other side of the corner to continue the operation about the shoe.

Another feature of the invention consists in the construction and operation of the several cooperating devices of the machine to cause the positions of the shank and forepart tools to be relatively shifted while wholly disengaged from the work to substitute one for the other in operating position without rounding off or otherwise marring the corner portion forming the juncture between the shank and forepart of a spade shank sole.

The several features of the invention consist also in the devices, combinations and arrangement of parts hereinafter described and claimed, which together with the advantages to be obtained thereby will be readily understood by one skilled in the art from the following description taken in connection with the accompanying drawings, in which

The machine herein disclosed as embodying in a preferred form the several features of the present invention, is of the general type as and has many features in common with the machine illustrated and described in applicant's prior Patent No. 1,919,740, dated July 25, 1933. In each machine there are provided suitable tools for performing the edge setting operation progressively along the bottom margin of a lasted shoe, a jack upon which the shoe is supported, and means for automatically controlling the movements of the jack so that no manual manipulation of the shoe by the operator is required during the operation.

The jack of the machine illustrated in the drawings, is substantially identical in construction and mode of operation with the jack disclosed in applicant's prior Patent No. 1,689,594, dated October 30, 1928. The jack comprises heel and toe supports 30 and 32 which are supported upon a vertical spindle 34 and which are actuated to clamp a lasted shoe automatically in proper position on the jack when the shoe is placed upon the jack by the operator, and which are automatically actuated at the conclusion of the edge setting operation to unclamp the shoe. During the edge setting operation the jack is moved in the direction of feed and is rotated to transfer the point of operation about the shoe from the heel breast of the shoe at one side to the heel breast at the other side, and simultaneously tipping movements are imparted to the jack to compensate for the transverse and longitudinal curvatures of the tread surface of the shoe sole. To enable the jack to be so actuated, it is mounted in the machine in substantially the same manner as the jack of the applicant's prior Patent No. 1,689,594 above referred to, and is acted upon by mechanism constructed and arranged and operated, except as hereinafter set forth, as the corresponding mechanism of the machine of said patent.

Briefly stated, the jack supporting structure comprises an arm 36 in the forward end of which the lower end of the jack spindle 34 is rotatably mounted by means of a gimbal joint, a support 38 upon which the arm 36 is mounted to swing vertically, and a frame 40 pivotally mounted at its lower end in the machine base so as to be capable of swinging about a horizontal axis, and upon which the support 38 is mounted to swing about a substantially vertical axis. The mechanism for moving the jack in the direction of feed, for rotating the jack, and for imparting tipping movements to the jack, comprises a vertical pattern cam shaft 42 upon which is mounted a feed cam 44, a turn cam 46, a pitch cam 48, a roll cam 50, a Baltimore cam 52, and an additional cam 54 which is provided for a purpose hereinafter more fully to be set forth. As illustrated in the drawings, a number of cam sets are provided on the pattern cam shaft for operation upon different lasts or shapes of shoes, in accordance with the usual practice in machines of this type. Feeding motions are imparted to the jack from the feed cam 44 through connections best shown in Fig. 6, which include the feed lever 56 connected to the toe portion 32 of the jack by means of the link 58, and the feed cam lever 60 which is supported on a post 62 and is connected to the feed lever through toggle links 64 and 66. Turning movements are imparted to the jack from the turn cam 46 by means of a cam lever 68 which is supported on the shaft 182 and has formed on one arm thereof a gear segment 70 arranged to engage with a pinion 72 formed on the hub of a pulley 74. A cord 76 secured at one end to the pulley 74, is arranged to pass around a wheel 78 which is carried on the arm 36, and serves as a rotatable support for the jack spindle 34 and gimbal joint above mentioned. At its other end the cord 76 is acted upon by a weight 80 which serves to maintain the requisite tension on the cord. Pitch tipping movements are imparted to the jack from the pitch cam 48 by means of a cam lever 82, one arm of which is connected by means of a link 84 to a forwardly extending arm 86 rigidly secured to the heel portion of the support 38. Roll tipping movements are imparted to the jack by means of a roll cam lever 88 which is supported on the post 182, and has one arm thereof connected by means of a link 90 to the frame 40.

As in the applicant's prior Patent No. 1,919,740 above referred to, the jack is moved yieldingly upwardly against a sole guide or hold-down 92 by means of two cords which are connected to the outer end of the jack supporting arm 36, and pass respectively over idler rolls 94 and 96, being connected together by means of a tension spring 98 which serves to provide an upward tension on the jack. There is also provided a jack control rod 100 which is connected at its forward end by means of a universal joint to the jack spindle 34, and at its rear end to an upwardly extending lever arm 102 pivotally supported on a bracket 104 on the rear wall of the machine base. A weight 106 supported on a cable 108 fastened to the control rod 100 and passing over the sleeve hub of the lever 102, tends normally to move the lever arm 102 and control rod 100 rearwardly to maintain the jack yieldingly in engagement with the edge setting tools.

The edge setting devices provided with the present construction, are substantially similar to those illustrated and described in applicant's prior Patent No. 1,919,740 above referred to, but may be briefly described as follows:—The edge setting devices comprise a forepart edge setting tool 112 and a shank edge setting tool 114 supported in a holder 116 which in turn is mounted on an actuating carriage 118. The carriage 118 is pivotally mounted at its rear end upon vertically aligned pivot pins 120, and is provided at its upper surface with a slot engaged by a roll 121 upon a crank pin 122 projecting from the lower end of the vertically arranged armature shaft 124 of an electric motor 126. This motor is mounted in the overhanging arm of the machine head, and through the connections described imparts a vibratory movement to the actuating carriage 118 and to the tools 112 and 114.

To enable the tool holder 116 to be readily adjusted so as to bring either tool 112 or 114 into a position to operate upon the sole edge of a shoe supported on the jack, and to cause the tool holder to vibrate with the actuating carriage 118, the tool holder is mounted upon the carriage by means of a vertical pivot pin 128 projecting downwardly from the carriage 118, and is provided at its rear end with a vertically arranged segmental surface 130 which is concentric with the axis of the pivot pin 128, and passes through the axis of the aligned pivot pins 120 of the carriage 118. The surface 130 is provided with a cam slot 132 and this cam slot is engaged by a pin at the forward end of an arm 134 pivoted at 136 upon the machine frame. The arm 134 extends through a slot 138 in the rear wall of a projection from the overhanging head of the machine frame, and is held securely against horizontal movement. The pin at the forward end of the arm 134 also intersects the axis of the pivot pins 120 of the actuating carriage 118, so that the point of engagement of the pin with the groove is also in line with this axis, and thus the tool holder 116 is caused to vibrate in unison with the actuating carriage, and no relative movement of the tool holder with relation to the carriage is produced so long as the arm 134 remains at rest. A vertical movement of the arm 134, however, moves the tool holder 116 with relation to the carriage 118, and the shape of the cam groove 132 is such that a movement of the forward end of the arm 134 from one end of the cam groove to the other, adjusts the tool holder so as to move one tool out of operative position, and the other tool into operative position. The interchange of the tools is effected automatically by means of the tool shifting cam 52 at a predetermined point or points in the transfer of the operation about the shoe, which is arranged through suitable connections to actuate the arm 134. These connections comprise a cam actuated lever 140, a link 142 connecting one end of the lever 140 with an arm 144 upon a vertical shaft 146, which shaft is provided with an arm 148 connected by a link 150 to the vertical arm of a bell-crank 152, the horizontal arm of which is connected by a link 154 to the arm 134.

The present machine is provided with a driving and stop motion which is constructed and arranged in accordance with the usual practice in machines of this type, to drive the pattern cam shaft at a relatively slow rate to transfer the point of operation about the shoe, and thereafter upon the completion of the operation on the shoe, to cause the jack and shoe supported thereon to be moved positively away from the operating tools to loading position, and to stop the rotation of the pattern cam shaft in its initial starting position. The stop motion herein disclosed is similar in many respects to that illustrated and described in the patent to Topham No. 1,791,176, dated February 3, 1931, to which reference may be had for the general principles of construction and operation of the stop motion, but in certain other respects has been considerably simplified and improved, in order to obtain certain objects of the present invention, as hereinafter will be more specifically pointed out. As in the patent to Topham above referred to, power for driving the pattern cam shaft is obtained from an electric motor which is connected through a friction clutch and braking unit and reduction gearing to drive the pattern cam shaft at a relatively slow rate. Mechanism is also provided for disengaging the clutch and applying the brake in the form of a lock bolt and lock bolt carrier which are tripped into operation at the end of the operation upon a shoe, to disengage the clutch and apply the brake, and thereafter to throw into operation an auxiliary driving mechanism which operates to move the jack to its inoperative or loading position, and to return the several cooperating units to their initial starting position.

In the operation of an automatic edge setting machine of the general type herein disclosed, difficulty has been encountered in securing a smooth, highly polished edge, due to a tendency of the edge setting tool to leave a series of small indentations or marks as the point of operation is continuously advanced in one direction around the margin of the shoe. To obviate this difficulty and thus to enable a higher quality of work to be performed on machines of this description, the invention contemplates the provision of means for causing the edge setting operation to be performed a second time and in a reverse direction about the shoe sole before the stop motion is rendered operative to stop the machine. To this end the driving and stopping devices of the present machine are constructed and arranged to cause the direction of rotation of the pattern cam shaft to be reversed when the point of operation has been transferred around the shoe, so that the identical cams and operating connections are employed to transfer the point of operation about the shoe in a reverse direction to insure a substantially identical operation of the shoe positioning devices to preserve the desired shape or contour of the sole edge. At the same time a slightly different angle of approach of the vibrating tools with relation to the work is secured due to the variation in the direction of the forces acting to feed and position the shoe during the return operation which serves advantageously to compensate for and iron out any irregularities or characteristic marks which may have been left in the edge surface by the tools during the first operation about the shoe.

As best shown in Figs. 1, 2, 4, and 5 of the drawings, the driving and stopping unit comprises a reversible electric motor generally indicated at 160 which is supported upon a vertical axis in a casing or housing 162 for the stop motion. The motor is operatively connected to a vertical drive shaft 164 which has loosely mounted thereon, a sleeve member 166. A flange 168 formed on the upper end of the sleeve carries one face of a conical friction clutch, the other member of which, indicated at 170, is rigidly secured to the drive shaft 164. A heavy compression spring 172 bearing against the lower end of the sleeve, tends to hold the clutch members in contact. The outer surface of the flange 168 forms one member of a friction brake, the opposing surface indicated at 174 being fixed in the machine frame. It will be seen that as the sleeve is moved downwardly against the pressure of the spring 172, the clutch is disengaged and the braking surfaces are brought into contact to bring the sleeve to a stop. Also carried on the sleeve 166 is a spiral gear 176 which meshes with a corresponding gear 178 formed on the upper end of a drive shaft 180, as best shown in dotted lines in Fig. 5. The shaft 180 is connected at its lower end through reduction gearing generally indicated in Figs. 2 and 5, to drive a shaft 182, which in turn carries a series of identical gears 184 meshing alternatively with a gear 186 on the pattern cam shaft 42. Inasmuch as these connections are substantially the same as those set forth in the patent to Topham above referred to, and form specifically no part of the present invention, further description thereof is believed unnecessary.

The mechanism for disengaging the clutch and applying the brake to stop the cam shaft at the proper time, comprises a cam groove 188 formed in the sleeve 166 and arranged to be engaged by a lock bolt 190 slidably mounted in a sleeve 192 on one arm of a bell-crank lever 194 which is mounted on a rock shaft 196. A spring 198 coiled about the lock bolt inside the sleeve 192 with one end resting against a shoulder in the sleeve and the other end bearing against the shoulder of the lock bolt, tends to hold the lock bolt in engagement with the cam groove. When the machine is at rest as in Figs. 4 and 5, the bell-crank lever acting in conjunction with the cam groove 188, is held in a position to hold the sleeve 166 downward against the pressure of its spring with the clutch released and the brake set by means of a latch lever 200 which is notched to engage the lower end of the bell-crank lever 194. A compression spring 202 tends to hold the latch lever in locking position.

For starting the machine, mechanism is provided which comprises the vertical link or rod 204 attached at its upper end to one end of a lever 206 and at its lower end slidably mounted in the machine frame. The lever 206 is pivoted at 208, and has formed thereon two downwardly extending arms 210 arranged to engage behind the flange 212 on the lock bolt 190, so that by depressing the rod the lock bolt may be withdrawn from the cam groove in the sleeve to permit the engagement of the clutch. At the same time a block 213 adjustably mounted on the rod is brought into contact with and depresses the latch lever 200 to release the bell-crank 194 which is then turned about its pivot by the spring 215 stretched between the lower arm of the lever 194 and a point on the machine frame. The exact position of the bell-crank lever and the lock bolt while the machine is running is determined by an adjustable screw 217 on the lower arm of the bell-crank which engages an abutment on the frame. The rod 204 is depressed by the operator to start the machine either by means of a hand lever 214 pivoted at 216 on the frame and connected at 218 by a pin and slot connection to the rod, or by a foot treadle through connections which include the plunger 220, and an angle lever 222 pivoted at 224 to the frame. The rod is then held in its depressed position by the engagement of a vertically arranged latch lever 226 mounted on a stationary pivot 228 which is pressed yieldingly into a limiting position against a stop pin 230 beneath the free end of the lever 206 by means of a tension spring 232 connected to the lower arm of the latch lever 226.

Figure 11:
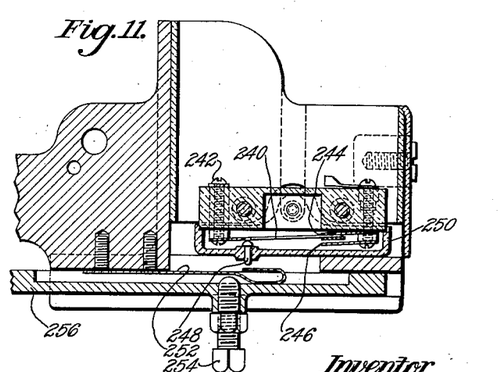
Fig. 11 is a detail sectional view taken on the line 11—11 of Fig. 8.

In accordance with the present invention, means are provided including a motor reversing switch and actuating connections which are rendered operative, after nearly one complete revolution of the pattern cam shaft to transfer the point of operation once about the shoe, to reverse the direction of rotation of the pattern shaft, so that the point of operation is transferred about the shoe a second time in a reverse direction, and then act as the pattern cam shaft returns to its initial starting position, to render the stop motion operative to disconnect the machine clutch and to move the jack and shoe supported thereon to inoperative or loading position. The reversing switch takes the form of a snap switch of ordinary construction such as disclosed in the Patent to Leupold No. 1,780,758 dated November 4, 1930 which as best shown in Figs. 6 to 11 inclusive, comprises a snap switch arm 240 in the form of a spring carried at one end on two terminal posts 242 which operates when released to snap away from a reversing switch contact 246 into engagement with a cooperating reversing switch contact 244 as best shown in Fig. 11. This position of the switch corresponds to the normal starting position of the machine. The position of the switch arm 240 is controlled by means of a bakelite pin 248 which is fitted into a hole formed in the switch casing 250, and is provided with an enlarged head engaging with the switch arm 240. Movement of the pin 248 upwardly into pressing engagement with the switch arm 240, acts to snap the outer or contact portion of the arm downwardly into engagement with the reversing contact 246. The bakelite pin 248 is acted upon to move the switch arm 240 positively into engagement with the reversing switch contact 246 by means of a spring actuating member 252 rigidly secured to the machine frame, and provided at its outer end with a looped portion which overlies the outer end of the actuating pin 248. The position of the spring actuating member 252 is in turn controlled by means of a pin 254 screw-threaded for adjustment in a slide member 256. Movement of the slide to the right from the position illustrated in Fig. 11, causes the pin 254 to engage with the loop portion of the spring actuating member 252, forcing this member upwardly to contact with and move the pin 248 into pressing engagement with the switch arm 240 causing the contact portion thereof to snap downwardly so that the circuit is broken through the contact 244, and is established through the reversing switch contact 246.

Figure 5:
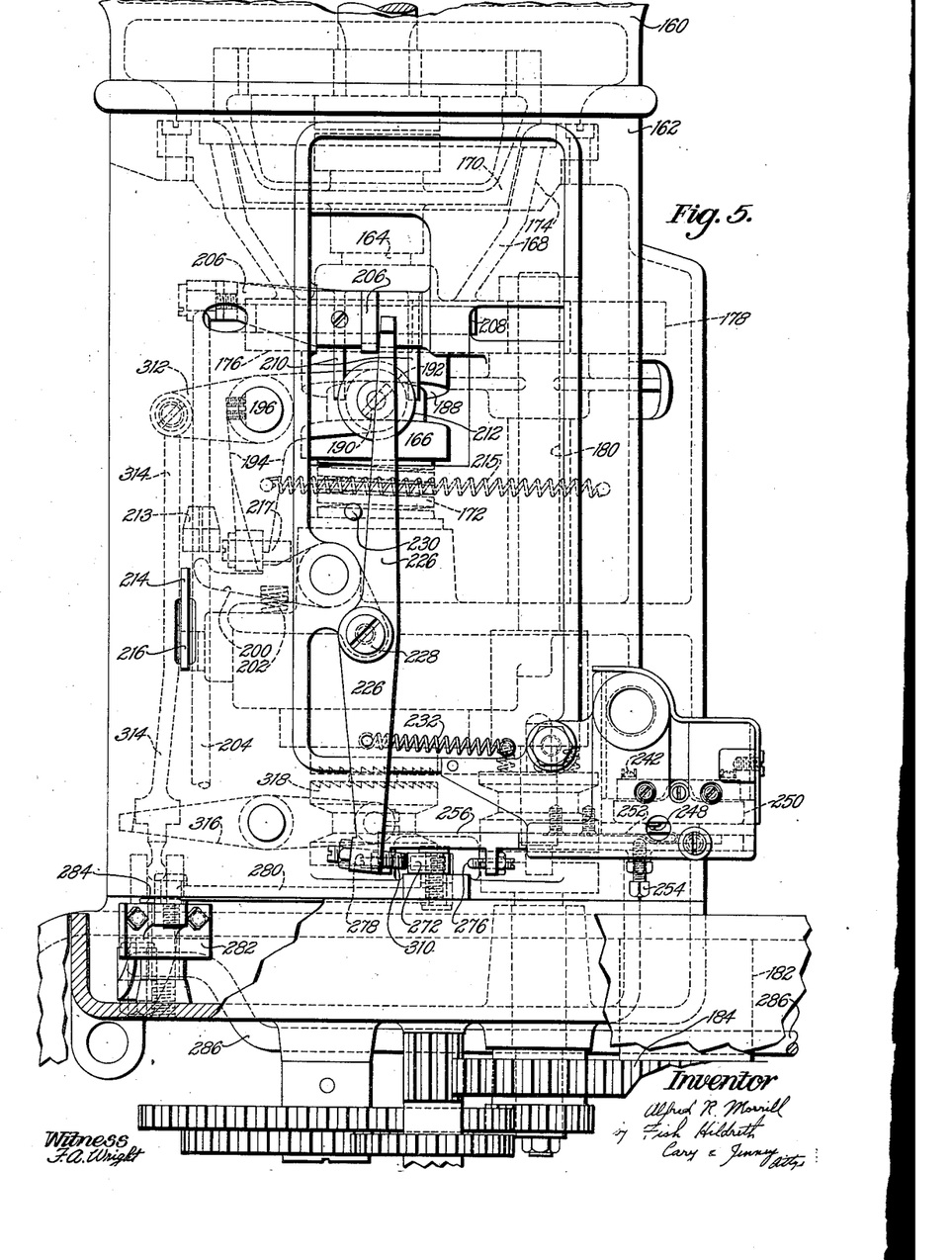
Fig. 5 is an enlarged view in right side elevation of the stop motion with the side removed and portions of the base broken away to show underlying parts.
Figure 6:
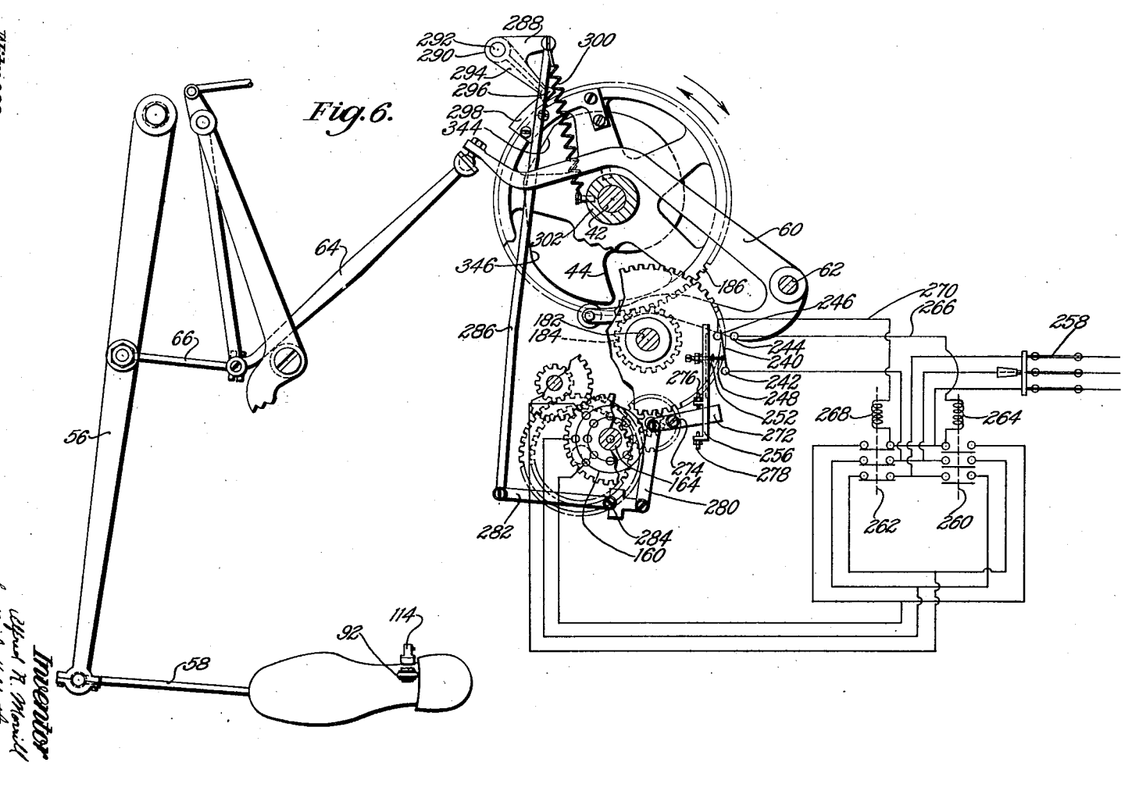
Fig. 6 is a fragmentary plan view partly diagrammatic of the feed connections to the pattern cam shaft and the control mechanism including reversing switch connections for reversing the direction of feed.
Figure 7:
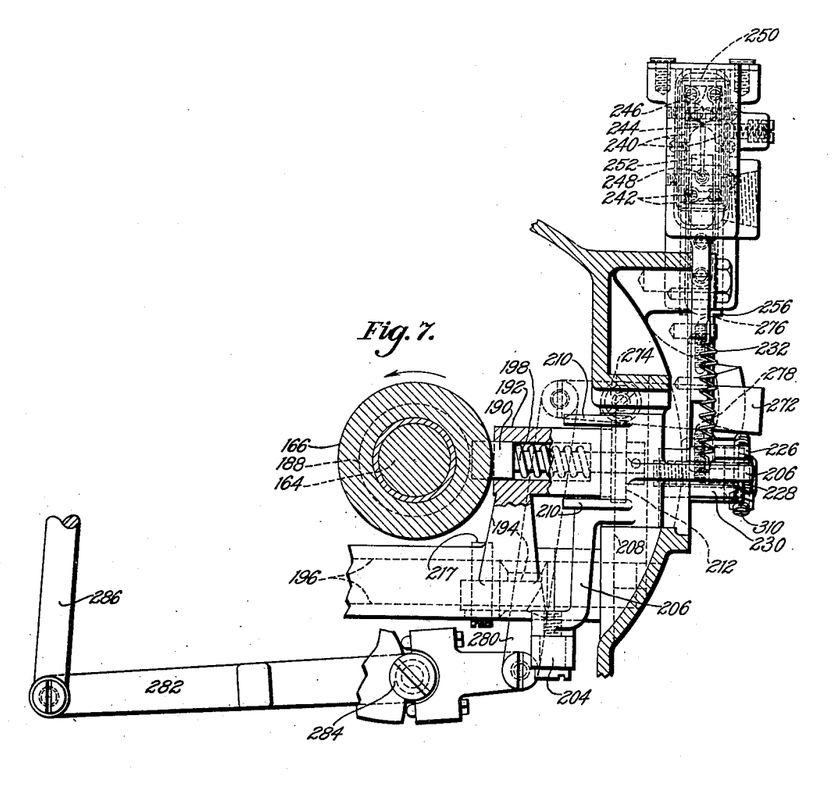
Fig. 7 is a detail plan view partly in section showing the lock bolt construction and connections for actuating the motor reversing switch.

The operation of the reversing switch to reverse the motor 160 will be readily understood from the electrical diagram, Fig. 6 of the drawings, which discloses suitable wiring connections for a three phase induction motor. The power supply for the motor is drawn from a three phase line through a main starting and stopping switch 258 and reversing switch contactors 260 and 262 which may be alternatively closed to drive the motor in opposite directions. The contactor 260 is controlled by a solenoid 264 which is energized to close the switch through a connection 266 to the switch contact 244. The switch 262 is actuated by means of a solenoid 268 which is connected to the reversing switch contact 246 through a connection 270. With the parts in the normal position ready for starting the operation upon a shoe, as shown in Figs. 5 and 11, the solenoid 264 is energized to maintain the contactor 260 in closed position. As the pattern cam shaft now reaches the limit of its movement in a clockwise direction, and the reversing switch is shifted to open the switch contact 244 and to close the contact 246, the solenoid 264 is de-energized and the solenoid 268 simultaneously energized to permit the opening of the contactor 260 and the closing of the reversing contactor 262, thus connecting the motor for operation in a reverse direction.

Figure 8:
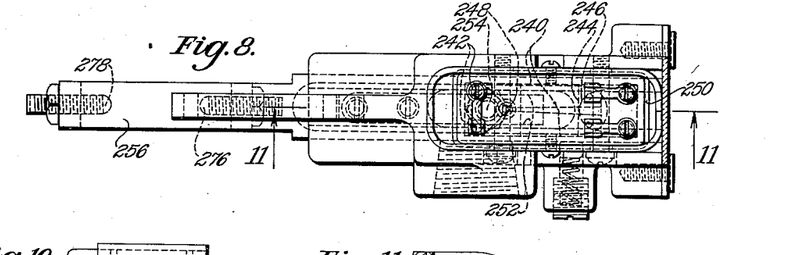
Fig. 8 is a detail plan view of the switch slide and the supporting bracket therefor.
Figure 9:
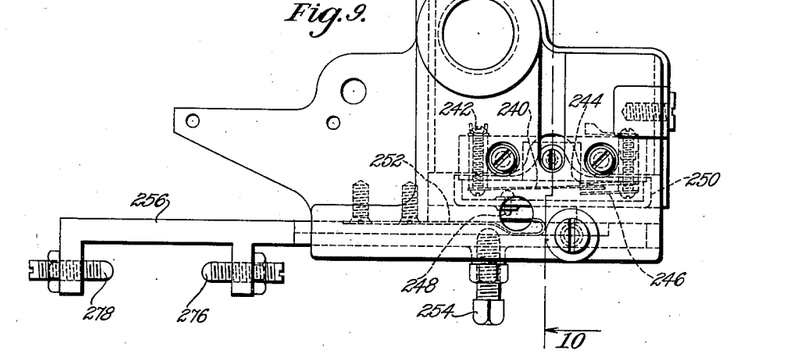
Fig. 9 is a view in right side elevation of the parts shown in Fig. 8.
Figure 10:
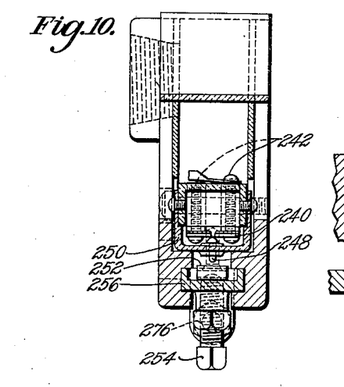
Fig. 10 is a sectional view taken on the line 10—10 of Fig. 9, showing particularly the construction of the switch.

The slide 256 as viewed in Figs. 5 and 8, is moved to the right to actuate the reversing switch 240 at the end of one operation about the shoe sole, and is then moved to the left upon stopping the machine to permit the return of the reversing switch 240 to its initial position to again reverse the motor through connections comprising an actuating lever 272 (see Figs. 3, 4, and 7) which is supported on a vertical pivot stud 274 and is arranged for contact alternatively with two oppositely located adjustable stop pins 276 and 278 (Figs. 8 and 9) screw-threaded into downwardly extending lugs formed on the slide 256. The position of the lever 272 is controlled from the pattern cam shaft through connections which include a link 280 connected at one end to the lever 272 and at its other end to a lever 282 carried on a pivot stud 284. The lever 282 is in turn connected through a link 286 to one arm of an actuating lever 288 (Figs. 2, 3, and 6) having a sleeve hub 290 pivotally supported on a vertical pivot shaft 292 on the machine base. There is also formed on the sleeve hub 290, an actuating lever in the form of a frame 294 which extends into the path of a block 298 rigidly secured to the upper face of the gear 186 on the pattern cam shaft 42. A tension spring 300 connected at one end to the lever arm 288 and at its other end to a pin on a sleeve bearing bracket 302 for the upper end of the pattern cam shaft, tends normally to maintain said connections including the lever 272 and slide 256 in starting position, as illustrated, for instance, in Figs. 5 and 11.

The connections above described for controlling the position of the slide 256 and motor reversing switch 240, are arranged also to throw into operation the stop motion to disengage the main starting and stopping clutch 168 as the pattern cam shaft is finally returned to its initial starting position. To this end the actuating lever 272 is arranged to extend into engagement with a stop pin 310 screw-threaded for adjustment into the lower end of the latch lever 226. The relationship of the parts is such that the latch lever 226 is moved against the actuating lever 272 by the relatively heavy spring 232 with sufficient force to overcome the spring tension supplied by the spring 300 acting through the connections above described on the lever 272 in an opposite direction. With the parts in the stop position shown in Fig. 5, the movement of the latch lever 226 is blocked by the engagement of the upper end of the latch lever with one side of the lever 206, so that the actuating lever 272 is maintained in an intermediate position.

Figure 1:
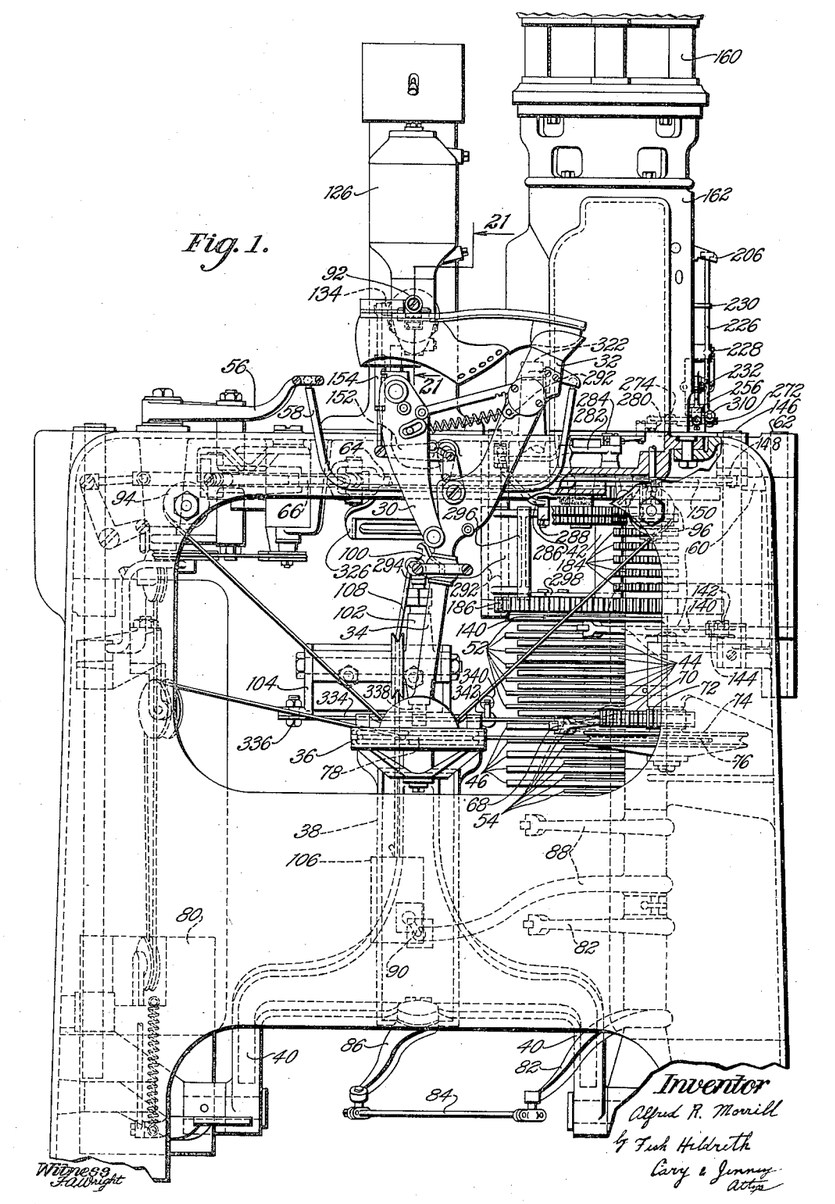
Fig. 1 is a view in front elevation of an automatic edge setting machine embodying the several features of the present invention.
Figure 2:
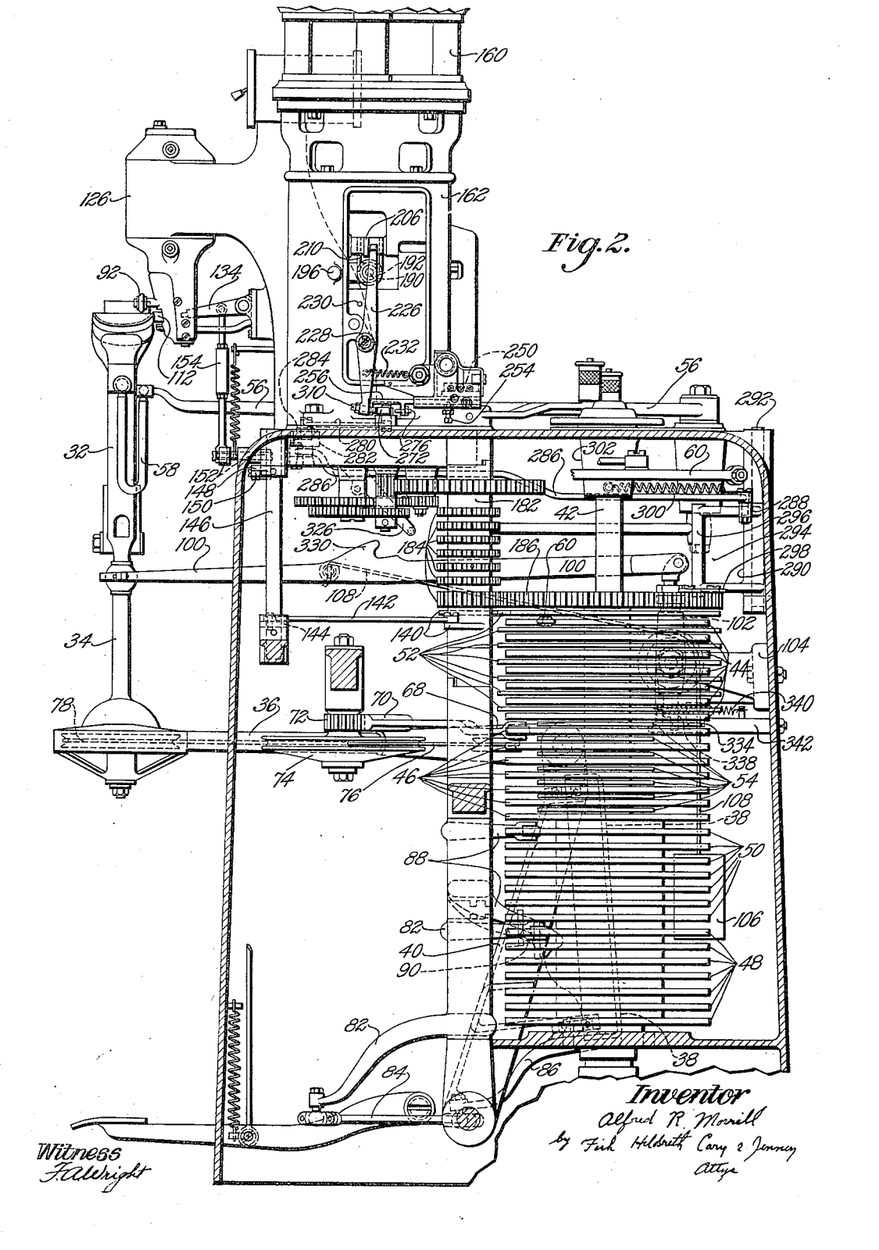
Fig. 2 is a view in right side elevation of the machine with the base casing broken away to show underlying parts.
Figure 3:
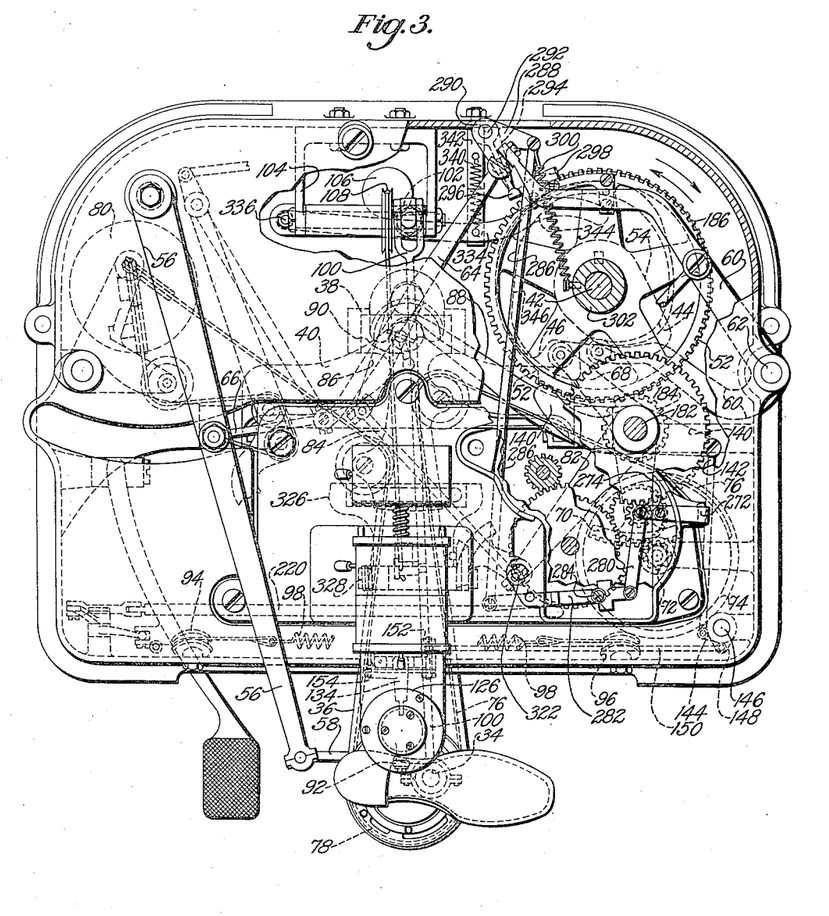
Fig. 3 is a plan view of the machine with the stop motion and portions of the casing broken away to show underlying parts.
Figure 4:
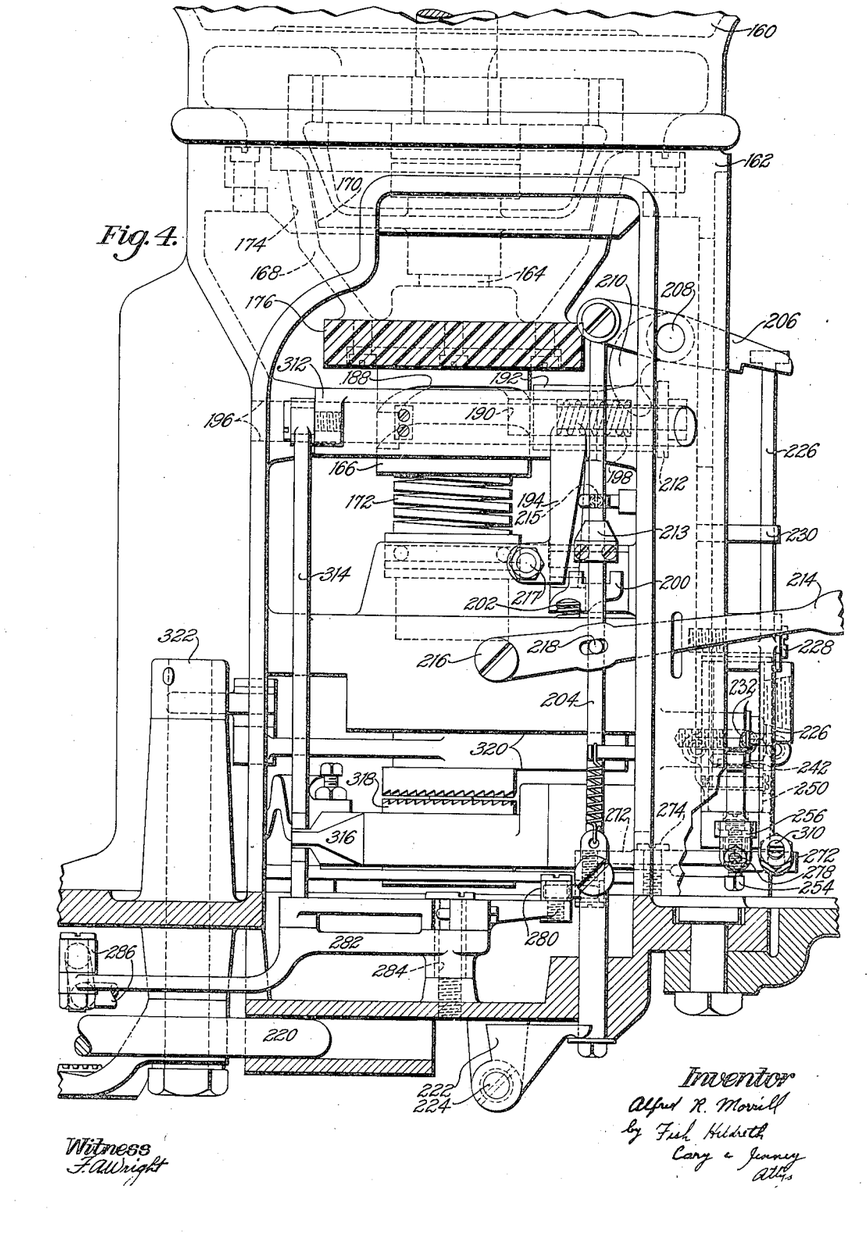
Fig. 4 is an enlarged view in front elevation of the stop motion with the casing cover removed and portions of the base beneath shown in section.

The operation of the driving and stopping mechanism to start the machine, to reverse the direction of drive at the completion of the edge setting operation in one direction about the shoe, and thereafter to disengage the machine clutch and again reverse the motor as the edge setting operation in the opposite direction is completed, may be briefly described as follows:—For the stop position of the machine, the block 298 will be positioned as shown in Fig. 3 on the opposite side of the lever 294 and lug 296 from that shown in Fig. 6. To start the machine, the control rod 204 is depressed, as above set forth, either by the actuation of the hand lever 214 or the foot treadle, causing the latch 200 to be tripped releasing the bell-crank 194, and the lever 206 to be rocked about its pivot in a direction to withdraw the locking bolt 190 from engagement with the cam groove 188, so that the sleeve 166 and driving clutch 168 are permitted to move upwardly under the pressure of the spring 172 to engage the clutch with the driving member 170. The latch lever 226 is permitted to move under the free end of the lever 206 and against the stop 230 under the pressure of its spring 232, so that the lock bolt is positively held in its retracted position. The pattern cam shaft 42 is now driven in a clockwise direction through nearly a complete revolution until the block 298 is brought into engagement with the frame lever 294, so that the lever 288 is moved about its pivot against the pressure of the spring 300, to move the actuating lever 272 and slide 256 engaged thereby rearwardly to shift the switch arm 240 to reverse position, and thus to reverse the direction of rotation of the motor 160. At this point the operating connections will occupy the position shown in Fig. 6 of the drawings. The pattern cam shaft now rotates in a counterclockwise direction to substantially its starting position when the block 298 again engages the lug 296 to move the lever 288 in an opposite direction, so that the actuating lever 272 is moved positively forward, causing the latch lever 226 to be moved against the pressure of its spring 232 out from under the lever 206, and releasing the lock bolt 190 which is now free to move into engagement with the cam groove 188. The forward movement of the actuating lever 272 also operates to move the slide 256 in a forward direction to disengage the pin 254 from under the spring cam 252, and permit the return of the reversing switch arm 240 to its initial position, again reversing the direction of drive of the motor.

The continued operation of the stop motion to disengage the machine clutch and thereafter to cause the jack to be moved away from the work to loading position, is substantially the same as that of the corresponding mechanism set forth in the Topham patent above referred to, but may be briefly described as follows:—Due to the raised position of the locking bolt lever 194 as determined by the operation of its spring 215, the locking bolt engages a high portion of the cam groove 188. The continued rotation of the sleeve 166 with the drive shaft 164, operates to rock the bell-crank lever 194 in a clockwise direction as shown in Fig. 5, so that the downwardly extending arm thereof moves behind the abutment of the latch lever 200. The return movement of the bell-crank as the locking bolt engages with the rise portion of the cam is positively arrested by engagement of the latch 200, thus causing the sleeve 166 and clutch 168 to be moved positively downward against the pressure of its spring 172 to disengage the clutch from the driving member 170, and causing the pattern cam shaft to be braked to an immediate stop by engagement of the clutch with the friction brake surface 174.

The movement of the locking bolt lever 194 above described, in stopping the machine, operates through connections including a lever arm 312 formed on the sleeve hub of the locking bolt lever 194, a downwardly extending link 314, and a clutch lever 316 to engage an auxiliary driving clutch 318 in operative relationship to the continuously driven shaft 164 for one revolution thereof, and thereafter to disengage the clutch. The auxiliary mechanism driven by the clutch 318 includes an eccentric strap generally indicated at 320 in Fig. 4, which operates to impart a rocking and return movement to a vertical rock shaft 322, which in turn operates through connections not here shown, to swing the frame 326 downwardly about its pivot 328 into engagement with a hook-shaped member 330 on the jack control rod 100 to move the jack and shoe supported thereon positively away from the tools.

In the operation of automatic machines of the general type herein described, adapted for the performance of edge setting, edge trimming or similar operations which determine finally the edge contour to be given to the shoe sole, it has been found that in the manufacture of certain types of shoe, and more particularly spade shank shoes having a sharply angled corner between the shank and forepart portion of the shoe sole, there is a tendency for the tools to round off the corner, with resulting injury to the appearance and marketability of the finished product. A principal feature of the present invention consists in the provision in an automatic machine of this general type, of means for controlling in a novel manner the relative positioning and feeding movements of the operating tools and the shoe to transfer the point of operation around the sharply angled portion or portions of the shoe sole. Means provided to this end comprise a cam 54 on the pattern cam shaft (see Figs. 12 and 13), and connections actuated thereby to disengage the shoe and the operating tools upon the completion of the operation upon one side of the corner, and to re-engage the shoe and the tool on the other side of the corner. The actuating connections comprise a cam lever 334 which is pivoted at 336 on the bracket 104, and is arranged intermediate its length to engage against a downwardly projecting member 338 formed on the sleeve hub of the supporting lever arm 102 for the jack control rod 100. A tension spring 340 connected at one end to a slide support 342 for the cam lever 334, and at its other end to the lever, tends to maintain the cam lever at all times in contact with the arm 338. With this construction, it will readily be seen that the engagement of the cam 54 with the cam lever 334 will operate to swing the lever 102 about its pivot to advance the jack control rod 100, and move the jack and shoe supported thereon away from the operating tools.

With the construction illustrated in the drawings, a feed cam 44 (see Fig. 12) having a specifically new construction and mode of operation is employed, having formed thereon two flattened portions 344 and 346 which are arranged to permit the advance of the point of operation exactly to the corner, to back feed the shoe slightly as it is disengaged from the tools, to advance the shoe while disengaged from the tool so that the operating tools will re-engage with the shoe at a point somewhat beyond the corner, and thereafter to back feed the shoe to bring the operating tools again exactly to the corner before continuing the feed in the usual manner.

Figure 14:
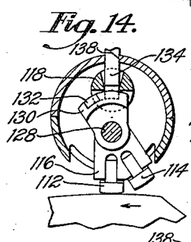
Figs. 14 to 20 inclusive, are a series of sectional detail plan views taken through the work head to show the successive steps in the operation of disengaging the tools from the work and shifting the edge setting tools to set the edge of the shoe at each side of the corner joining the shank and the forepart of a spade shank shoe sole.
Figure 15:
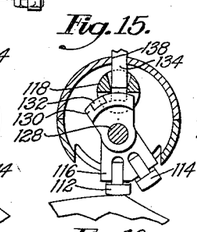
Figure 16:
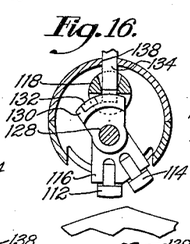
Figure 17:
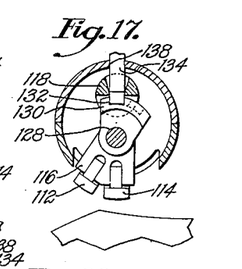
Figures 18, 19:
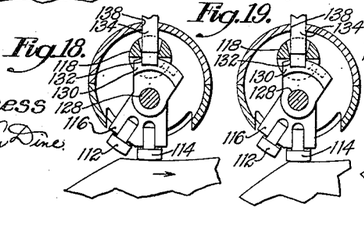
Figure 20:
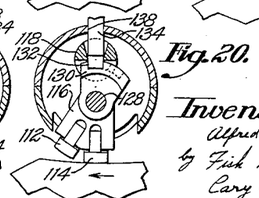
Figure 21:
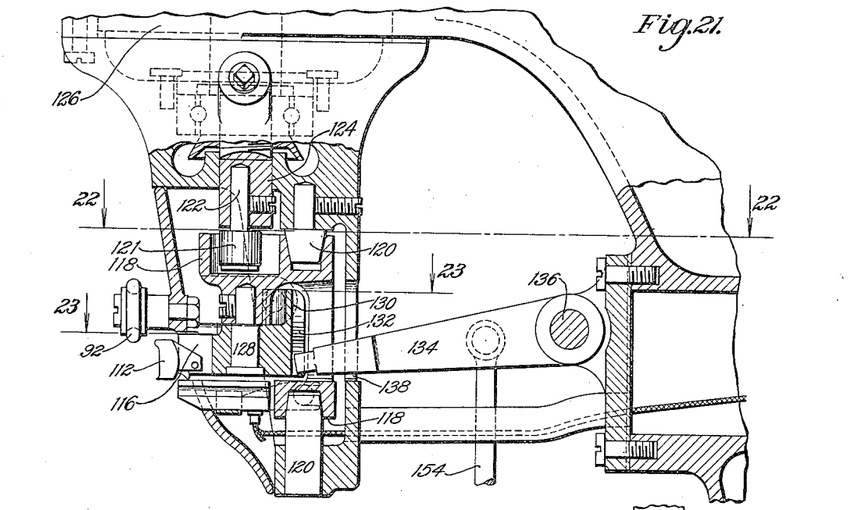
Fig. 21 is an enlarged detail sectional view taken substantially on the line 21—21 of Fig. 1, to illustrate particularly the operating mechanism for the edge setting tools.
Figure 22:
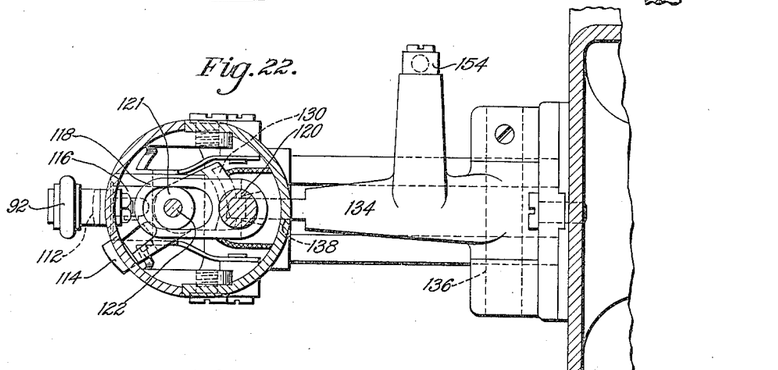
Fig. 22 is a sectional plan view taken on the line 22—22 of Fig. 21.
Figures 23, 24:
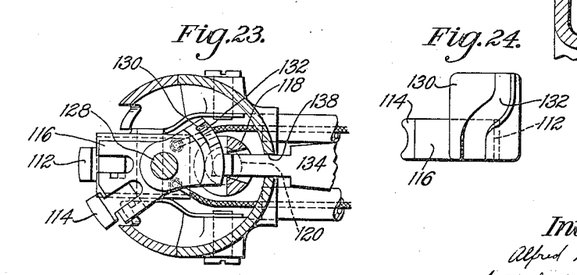
Fig. 23 is a sectional view taken on the line 23—23 of Fig. 21.
Fig. 24 is a detail view looking from the rear of the tool holder illustrating particularly the cam path forming a portion of the means by which the tool holder is actuated to substitute one tool for the other.

Another feature of the present invention consists in the construction and timing of the several cooperating devices above described, so that the relative shifting of the forepart and shank edge setting tools alternatively into operating position at the sharply angled corner between the spade shank and forepart portions of the sole, will take place while the tools are wholly disengaged from the work, to prevent possible injury to the corner as one tool is substituted for the other in operating position. The steps of the operation of edge setting the shoe sole upon one side of the corner, and of thereafter transferring the operation to the other side of the corner and simultaneously shifting the alternate tool to operating position, are illustrated in Figs. 14 to 20 inclusive, of the drawings, in which Fig. 14 shows the forepart edge setting tool approaching the corner, Fig. 15 shows the positions taken just prior to the beginning of the first back feeding movement with the tool operating exactly at the corner, Fig. 16 shows the positions taken subsequent to the back feed and the lifting of the work away from the tool, Fig. 17 shows the parts in the positions taken after the shank edge setting tool has been shifted into operating position, but with the shoe still out of engagement with the tool, Fig. 18 shows the parts in the positions taken just as the shank edge setting tool engages with the opposite side of the corner, Fig. 19 shows the position of the parts taken as the shoe is again back fed to bring the shank edge setting tool exactly to the corner, and in Fig. 20 the feed of the shoe has been resumed in a forward direction to perform the edge setting operation on the shank portion thereof. In order to allow a sufficient amount of time for the performance of the several operations above described in transferring the point of operation about a sharply angled corner of a spade shoe sole, and thus to permit the use of easy, smooth acting cam motions, the proportions of the several operating cams on the pattern cam shaft have been modified, so that a relatively large portion of the angular movement of the pattern cam shaft may be utilized for the performance of these operations. These changes in the shapes of the several operating cams have the effect of considerably slowing down the feed of the shoe at the corner.

Figures 12, 13:
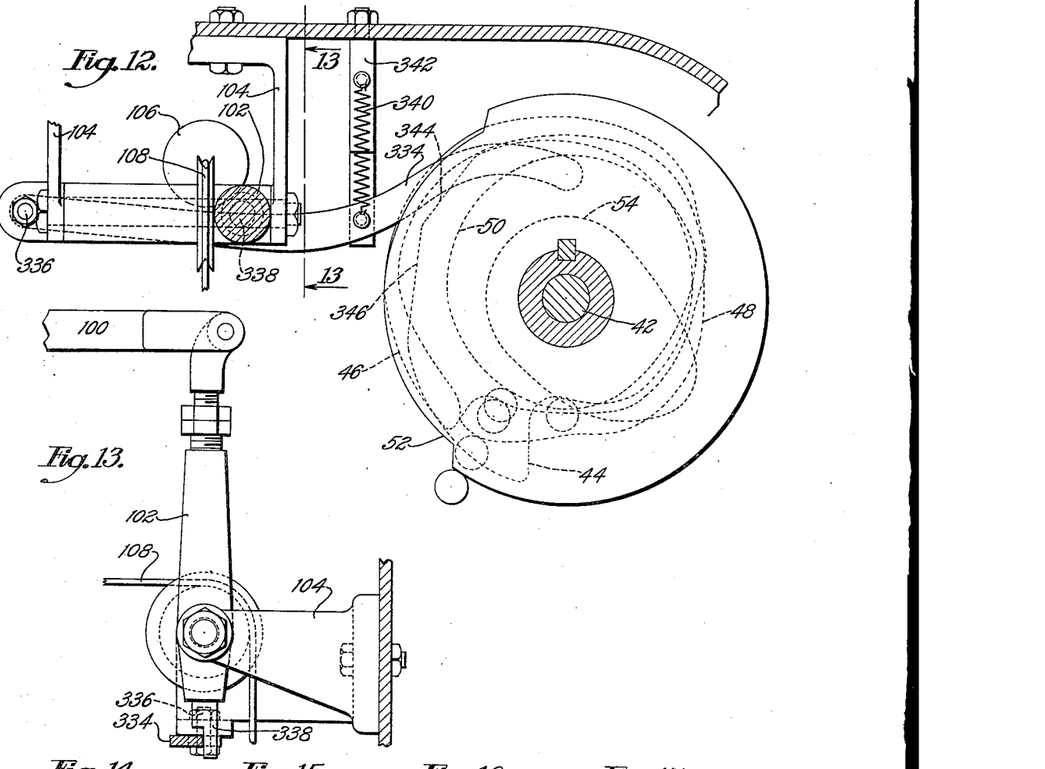
Fig. 12 is an enlarged detail sectional plan view illustrating particularly the cams on the pattern cam shaft and the mechanism for disengaging the tools from the work.
Fig. 13 is a sectional view taken on the line 13—13 of Fig. 12, and showing the connection to the rear end of the jack control rod.

It will be seen from an inspection of the cam contours illustrated in Fig. 12, and from Figs. 14 to 20 inclusive, that the jack feeding and positioning devices are constructed and arranged to cause the edge setting tools to operate in substantially an identical manner to finish off each side of the corner between the spade shank and forepart portions of the shoe, so that a substantially identical mode of operation of the edge setting devices is obtained during the transfer of the point of operation about the shoe in either direction to cause the edge setting tool to be moved exactly to the corner, and thereafter to be back fed and removed from engagement with the work. The other tool then engages with the work at the other side of and slightly beyond the corner, and is then back fed to the corner before the advance of the shoe is again resumed to complete the operation about the shoe sole.

The construction and arrangement of the jack feeding devices above described, for causing the shoe and operating tools to be relatively disengaged upon completion of the operation on one side of the corner, and thereafter to be re-engaged at a point somewhat beyond the corner, is also of particular value in an edge setting machine of the type herein disclosed, in which the operating tool acts also as an edge guide, in preventing the rounding off of the corner, while at the same time insuring the satisfactory operation of the tools to secure a smooth, highly polished edge up to the corner upon each side thereof.

Another feature of the invention consists in the novel construction and arrangement of the edge setting tools in combination with the shoe supporting and guiding devices operating as above described whereby the shoe and tools are moved relatively out of engagement, and thereafter are reengaged with certainty and ease in exactly the required relationship for the continuance of the operation about the shoe sole. As previously pointed out, the supporting devices for the jack are constructed and arranged to force the shoe upwardly against a sole guide 92, and rearwardly directly against the operating tool which serves as an edge guide, and also is mounted in such a manner as to adjust itself automatically to any slight variations in the angle of the sole edge surface from the vertical. When the jack and shoe supported thereon are now moved away from the operating tools in transferring the operation about the corner, the sole guide 92 operates in a novel manner in combination with the jack supporting devices to maintain the shoe at the desired level, and thereafter to re-position the shoe in contact with the operating tool. As the shoe is again returned to operative position, the edge setting tool is automatically adjusted by contact with the sole edge to conform exactly to the angle of the sole edge surface, thus avoiding the necessity for extensive changes which might otherwise be necessary in the contours of the pitch and roll pattern cams to present the shoe properly to the operating devices during the back feeding movements of the shoe above described.

While the machine as shown in the accompanying drawings has been set up for operation upon a shoe having a sharply angled corner between the spade shank and forepart portion of the sole on only one side thereof, it will be understood that the machine is equally well adapted for operation upon shoes having sharply angled corners between the shank and forepart upon both sides of the shoe, it being necessary only to substitute a new set of operating cams on the pattern cam shaft constructed and arranged in accordance with the principles above set forth, and operating in substantially the same manner to finish off the corners where so desired on both the inner and outer sides of the shoe sole.

The invention having been described, what is claimed is:—

1. A machine for operating upon shoes having, in combination, means for performing an operation upon the edge surface of the shoe sole, a shoe supporting jack, means for relatively moving the shoe and said operating means to transfer the point of operation about the margin of a spade shank shoe, and means acting during the continued operation of the machine to disengage the shoe and said operating means at the completion of the operation upon one side of the corner between the spade shank and ball portion of the sole, and thereafter to re-engage the shoe and said operating means to continue the operation upon the other side of said corner.

2. A machine for operating upon shoes having, in combination, means for performing an operation upon the edge surface of the shoe sole, a shoe supporting jack, feeding and positioning devices for the jack to transfer the point of operation about the margin of a spade shank shoe, and means acting on the jack to disengage the shoe from said operating means to transfer the point of operation from one side to the other of the corner between the spade shank and the ball portion of the sole, said feeding devices being arranged to back feed the shoe at the completion of one side of the corner, and again to back feed the shoe to finish the other side of said corner upon engagement of said operating means therewith.

3. A machine for operating upon shoes having, in combination, means comprising a shank tool and a forepart tool for performing an operation upon the margin of a shoe sole, a shoe supporting jack, means for relatively moving the shoe and said operating means to transfer the point of operation about the margin of a spade shank shoe, means acting during the continued operation of the machine to disengage the shoe and said operating means to transfer the point of operation from one side to the other of the corner between the spade shank and ball portion of the sole, and means acting to shift the tools while disengaged from the shoe.

4. A machine for operating upon shoes having, in combination, means comprising a shank tool and a forepart tool for performing an operation upon the margin of a shoe sole, a shoe supporting jack, feeding and positioning devices acting on the jack to transfer the point of operation about the margin of a spade shank shoe, means acting on the jack to disengage the shoe from said tools to transfer the point of operation from one side to the other of the corner between the spade shank and ball portion of the sole, and means acting to shift the tools while disengaged from the shoe.

5. A machine for operating upon shoes having, in combination, an edge setting tool, a shoe supporting jack, feeding and positioning devices acting on the jack to transfer the point of operation about the margin of a spade shank shoe including a feed cam shaped to back feed the shoe at the completion of one side of the corner between the spade shank and forepart portions of the sole, to transfer the point of operation about the corner, and again to back feed the shoe to the corner, and means acting on the jack to disengage the shoe from said tool to transfer the point of operation from one side to the other of the corner.

6. A machine for operating upon shoes having, in combination, an edge setting tool, a shoe supporting jack, feeding and positioning devices acting on the jack to transfer the point of operation about the margin of a spade shank shoe, a sole guide, means for supporting the jack and shoe yieldingly in engagement with the sole guide, a control bar, means acting on said bar to maintain the shoe yieldingly against the edge setting tool, and means for moving said bar to disengage the shoe from the tool to transfer the point of operation from one side to the other of the corner between the spade shank and ball portions of the sole.

7. A machine for operating upon shoes having, in combination, an edge setting tool freely adjustable to the plane of the edge surface of the sole, a shoe supporting jack, means for moving the jack and shoe supported thereon relatively to the edge setting tool to transfer the point of operation about the sole of a spade shank shoe comprising cams and connections associated therewith for imparting feeding, turning and tipping movements to the jack, a sole guide, means for supporting the jack and shoe yieldingly in engagement with the sole guide, a control bar connected to the jack, means acting on said bar to maintain the shoe yieldingly against the edge setting tool, and cam means for moving said bar to disengage the shoe from the tool to transfer the point of operation from one side to the other of the corner between the spade shank and ball portions of the sole.

8. A machine for operating upon shoes having, in combination, means for performing an operation upon the margin of a shoe sole, a shoe supporting jack, means for moving the jack and shoe supported thereon relatively to the operating means to transfer the point of operation about the shoe comprising cams and connections associated therewith for imparting feeding, turning and tipping movements to the jack, means for actuating said cams to transfer the point of operation about the shoe, and means for reversing the operation of said cams to transfer the point of operation again about the shoe in a reverse direction.

9. A machine for operating upon shoes having, in combination, means for performing an operation upon the margin of a shoe sole, a shoe supporting jack, means for moving the jack and shoe supported thereon relatively to the operating means to transfer the point of operation about the shoe including a pattern cam shaft, cams and operating connections associated therewith for imparting feeding, tipping and turning movements to the jack, means for rotating the cam shaft, and means rendered operative at the completion of one operation about the shoe to reverse the direction of rotation of the cam shaft to transfer the point of operation about the sole in a reverse direction.

10. A machine for operating upon shoes having, in combination, means for performing an operation upon the margin of a shoe sole, a shoe supporting jack, means for moving the jack and shoe supported thereon relatively to the operating means to transfer the point of operation about the shoe comprising a pattern cam shaft, means for rotating the shaft, cams and connections associated therewith arranged during one revolution of said shaft to transfer the point of operation about the shoe, and means rendered operative at the completion of the operation about the shoe to reverse the direction of rotation of the shaft to transfer the point of operation about the shoe a second time in a reverse direction.

11. A machine for operating upon shoes having, in combination, means for performing an operation upon the margin of a shoe sole, a shoe supporting jack, means for moving the jack and shoe supported thereon relatively to the operating means to transfer the point of operation about the shoe comprising a pattern cam shaft, means for rotating the shaft, cams and connections associated therewith arranged during one revolution of said shaft to transfer the point of operation about the shoe, means rendered operative at the completion of the operation about the shoe to reverse the direction of rotation of the shaft to transfer the point of operation about the shoe a second time in a reverse direction, and means rendered operative upon the return of said shaft to starting position to stop the shaft.

12. A machine for operating upon shoes having, in combination, means for performing an operation upon the margin of a shoe sole, a shoe supporting jack, means for moving the jack and shoe supported thereon relatively to the operating means to transfer the point of operation about the shoe comprising a pattern cam shaft, cams and connections associated therewith arranged during one revolution of the shaft to transfer the point of operation about the shoe, a reversible electric motor connected to drive the shaft, a reversing switch for the motor, means controlled from the pattern cam shaft upon the completion of the operation about the shoe to reverse the motor to transfer the point of operation about the shoe in a reverse direction, and means for stopping the shaft upon the return thereof to starting position.

13. A machine for operating upon shoes having, in combination, means for performing an operation upon the margin of a shoe sole, a shoe supporting jack, means for moving the jack and shoe supported thereon relatively to the operating means to transfer the point of operation about the shoe comprising a pattern cam shaft, cams and connections associated therewith arranged during one revolution of the shaft to transfer the point of operation about the shoe, a reversible electric motor connected to drive the pattern cam shaft, a reversing switch for the motor, means controlled from the shaft upon completion of the operation about the shoe to reverse the motor to transfer the point of operation about the shoe in a reverse direction, and means rendered operative upon the return of the shaft to starting position to again reverse the motor and to disconnect the shaft from the motor.

14. A machine for operating upon shoes having, in combination, means for performing an operation upon the margin of a shoe sole, a shoe supporting jack, means for moving the jack and shoe supported thereon relatively to the operating means to transfer the point of operation about the shoe comprising a pattern cam shaft, cams and connections associated therewith arranged during one revolution of the shaft to transfer the point of operation about the shoe, a reversible electric motor, a machine stop motion including a clutch connection between the motor and the shaft, means controlled from the pattern cam shaft upon the completion of the operation about the shoe to reverse the motor, and means rendered operative upon the return of the shaft to starting position for actuating the stop motion to disengage the clutch and to again reverse the motor.

15. A machine for operating upon shoes having, in combination, means for performing an operation upon the margin of a shoe sole, a shoe supporting jack, means for moving the jack and shoe supported thereon relatively to the operating means to transfer the point of operation about the shoe comprising a pattern cam shaft, cams and connections associated therewith arranged during one revolution of the shaft to transfer the point of operation about the shoe, a reversible electric motor, a motor reversing switch, a switch control member, a machine stop motion including a clutch connection between the motor and the shaft, and a latch movable to disconnect said clutch, connections including an actuating lever actuated in one direction by the pattern cam shaft upon the completion of the operation about the shoe to move said switch control member to reverse the motor and movable in an opposite direction by the pattern cam shaft upon the return of the shaft to starting position to move said switch control member to again reverse the motor and to trip the latch to disengage the clutch.

ALFRED R. MORRILL.